J. E. TAYLOR.
GIN SAW GUMMING MACHINE.
APPLICATION FILED MAR. 19, 1915. RENEWED MAY 26, 1916.
1,210,723.
Patented Jan. 2, 1917.
2 SHEETS—SHEET 1.
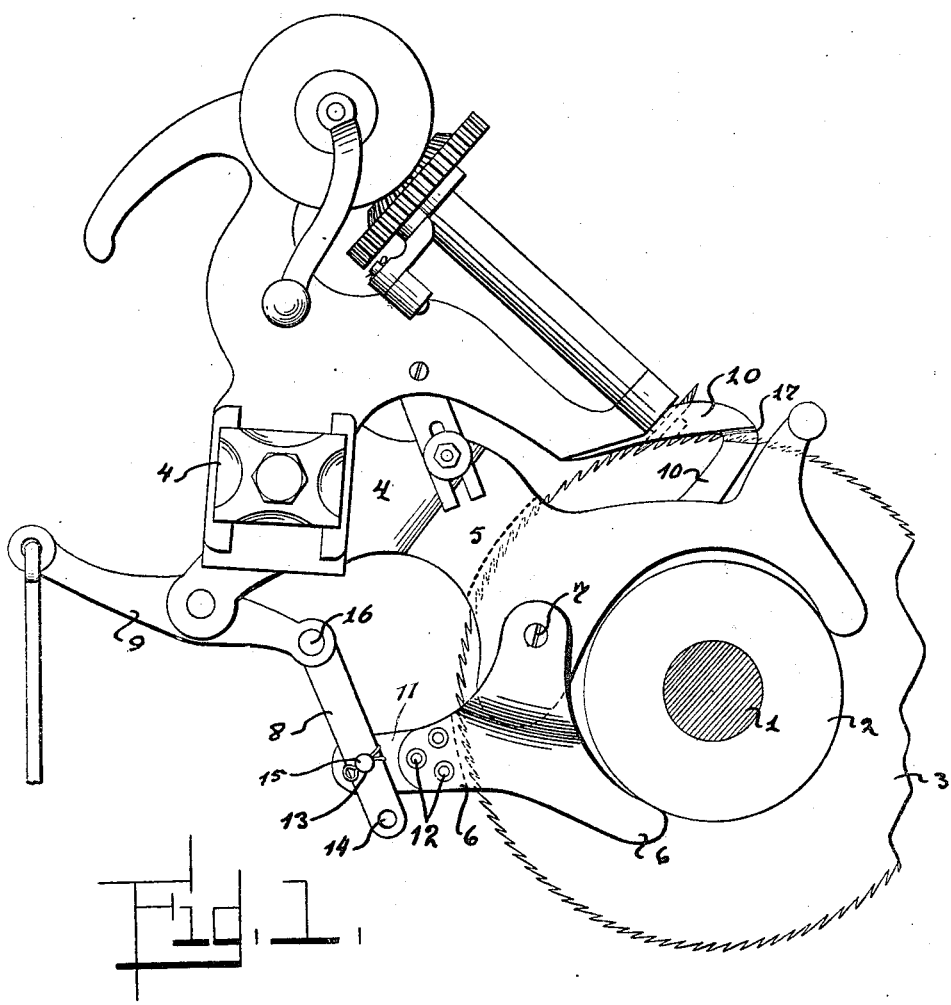
WITNESSES:
INVENTOR
J. E. Taylor
ATTORNEY J. E. TAYLOR.
GIN SAW GUMMING MACHINE.
APPLICATION FILED MAR. 19, 1915. RENEWED MAY 26, 1916.
1,210,723.
Patented Jan. 2, 1917.
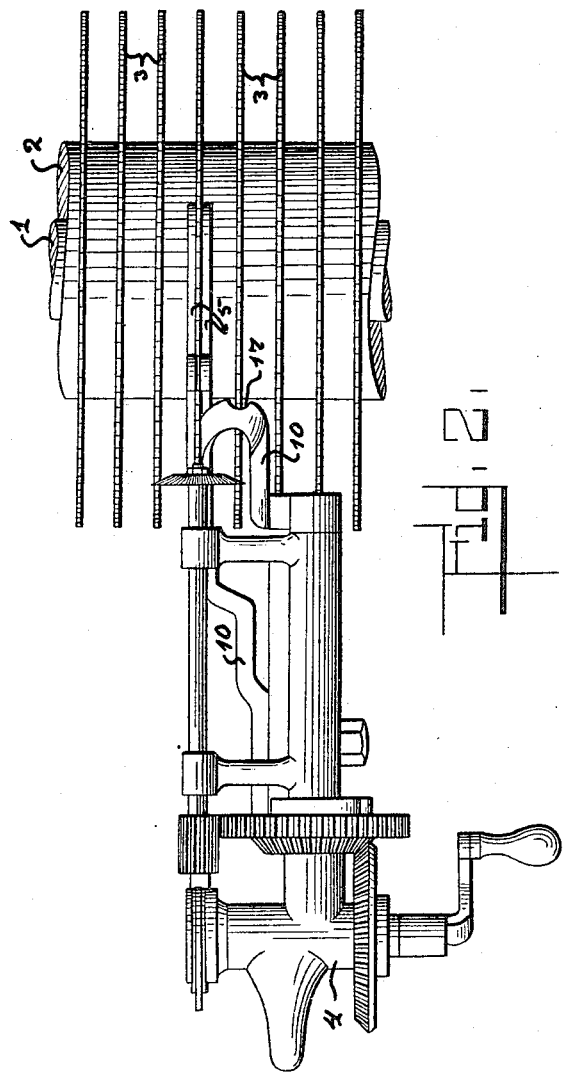
WITNESSES:
INVENTOR
J. E. Taylor
BY
ATTORNEY

UNITED STATES PATENT OFFICE.

JAMES E. TAYLOR, OF McKINNEY, TEXAS.

GIN-SAW-GUMMING MACHINE.

1,210,723. Specification of Letters Patent. Patented Jan. 2, 1917.

Application filed March 19, 1915, Serial No. 15,442. Renewed May 26, 1916. Serial No. 100,156.

*To all whom it may concern:*

Be it known that I, JAMES E. TAYLOR, a citizen of the United States, residing at McKinney, in the county of Collin and State of Texas, have invented certain new and useful Improvements in Gin-Saw-Gumming Machines, of which the following is a specification.

My invention has relation to a gin saw gumming machine and in such connection it relates particularly to an adjustable means for clamping the machine to varying diameters of space blocks on gin saws of varying diameters. Heretofore in devices of this kind it was possible to adjust and use the gummer upon various gin saw cylinders only by an adjustment of the clamping members of the frame of the machine in which the point of pivotal connection between the two clamping members was adjusted. In other words where a space block of larger diameter than ordinary was to be encircled by the clamping jaws of the gummer frame, the pivot between the two jaws was moved so that the movable jaw and the stationary jaw of the clamp were more widely separated from each other in both open and closed positions. However, in a great many gin saw cylinders even this form of adjustment for the saw gummer frame could not be used for the reason that the wider swing necessarily given to the movable jaw necessitates the alteration and reconstruction of other parts of the frame work to permit of the proper opening and closing of the movable jaw.

In my present improvement the pivotal connection between the two jaw members of the clamping frame remains fixed no matter what the diameters of the saws and their space blocks may be and the movable jaw member is given a longer or shorter range of movement on its pivot by means of a lever and link connection with the free end of the movable jaw, said link being adjustably connected at one end directly to the free or operating end of the clamping jaw and permanently pivoted at its other end to the operating lever. With this form of construction it is necessary where the gummer is applied to the larger diameter of gin saws to notch or groove that part of the gummer frame which spans the toothed periphery of an adjacent saw, but such notching or grooving of the "spanner" may be readily and cheaply accomplished even in machines containing the unnotched spanner, and the notching or grooving does not necessitate any rearrangement of parts or a material weakening of the part so notched.

The nature and scope of my invention will be more fully understood from the following description taken in connection with the accompanying drawings, forming part hereof, in which—

Figure 1 is a side elevational view of a gin saw gumming machine embodying main features of my invention, and Fig. 2 a top or plan view thereof, the machine in both views being shown in operative position on a gin-saw cylinder.

Referring to the drawings, 1 is the shaft, 2 the space blocks and 3 the saws of an ordinary gin saw cylinder, to which the gumming machine may be attached. For the purposes of this invention only the parts of the gumming machine necessary to the proper understanding of the invention need be described. These parts are a main frame work 4 from which projects the fixed clamping jaw 5; a movable clamping jaw 6 pivoted as at 7 directly to the fixed jaw 5; a link 8 and lever 9 for operating the movable jaws and a spanner 10 projecting from the main frame 4 and inclosing a saw 3 adjacent to the one to be gummed. This spanner 10 serves as a reinforcement or support for the fixed clamping jaw 5. Both the fixed jaw 5 and the movable jaw 6 are bifurcated to inclose a saw 3 to be gummed. The two jaws 5 and 6 at a point where they are bifurcated are pivotally connected as at 7, that is to say each wing of jaw 5 is pivotally connected to an overlapping wing of jaw 6 and the pivots 7 are in alinement with each other. The two wings of jaw 6 are united together and to a short arm 11 by bolts or screws or rivets 12.

The link 8 is provided with two or more openings 13 and 14 in one of which a pin 15 on the arm 11 is adapted to enter so as to pivotally connect the jaw 6 to said link 8. The other end of link 8 is connected by pivot 16 to the lever 9.

The under face of the spanner 10 is notched or grooved as at 17 at that part where the spanner incloses a saw 3 adjacent to the saw which is being gummed.

In the operation of the device, when the pivot pin 15 of arm 11 of the movable jaw 6 is in the opening 13 nearest the pivoted end 16 of lever 9 as shown in the drawings, the two jaws 5 and 6 are permitted to grasp a space block 2 of larger diameter than they will grasp if the pivotal connection between the jaw 6 and link 8 be at opening 14, since the jaw 6 will be swung on its pivot 7 inward toward the coacting part of fixed jaw 5 when the arm 11 of the jaw 6 is shifted to the opening 14. Whether the movable jaw 6 has its pivotal connection with link 8 at either opening 13 or 14 a movement of the pivot end 16 of lever 7 upward toward main frame 4 will swing the jaw 6 away from space block 2 to permit of the withdrawal of the gummer from the saw cylinder, and the distance through which the lever 9 and link 8 may move toward main frame 4 without abutting on said frame is sufficient to permit a full clearance for the jaws 5 and 6 from said space block. The notching of the spanner 10 as at 17 forms an adjustment for the frame of the gummer to accommodate saws of say 12 or 12½ inch diameter and thus coöperate with the new pivotal adjustment of the movable jaw 6.

Having thus described the nature and objects of my invention what I claim as new and desire to secure by Letters Patent, is:

1. In a saw gumming machine, the combination of a fixed and a movable clamping jaw, and a pivotal connection between said jaws, with a lever and link for operating the movable jaw said link being adjustably and pivotally connected with said movable jaw.

2. In a saw gumming machine, a main frame, a spanner carried by said frame and having its under spanning face notched, a fixed clamping jaw projecting from the main frame, a movable clamping jaw pivotally supported by said fixed jaw, an arm and pin projecting from the movable jaw, a link having a series of openings arranged to receive the pin on said arm, and a lever pivotally connected with one end of said link.

In testimony whereof I have signed my name to this specification in the presence of two subscribing witnesses.

JAMES E. TAYLOR.

Witnesses:
G. C. WALDROP,
G. SCHUMM.